United States Patent
Yap et al.

(10) Patent No.: US 10,915,782 B2
(45) Date of Patent: Feb. 9, 2021

(54) IMAGE PARAMETER CALCULATING METHOD, OBJECT TRACKING METHOD, AND IMAGE PARAMETER CALCULATING SYSTEM

(71) Applicant: PixArt Imaging Inc., Hsin-Chu (TW)

(72) Inventors: Kok Sing Yap, Penang (MY); Tong Sen Liew, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 155 days.

(21) Appl. No.: 15/841,327

(22) Filed: Dec. 14, 2017

(65) Prior Publication Data

US 2019/0188517 A1    Jun. 20, 2019

(51) Int. Cl.
| | | |
|---|---|---|
| G06K 9/46 | (2006.01) | |
| G06K 9/52 | (2006.01) | |
| G06T 7/246 | (2017.01) | |
| G06T 7/262 | (2017.01) | |

(52) U.S. Cl.
CPC ........... G06K 9/4642 (2013.01); G06K 9/522 (2013.01); G06T 7/248 (2017.01); G06T 7/262 (2017.01); *G06T 2207/10016* (2013.01); *G06T 2207/20021* (2013.01); *G06T 2207/20056* (2013.01)

(58) Field of Classification Search
CPC ...... G06K 9/4642; G06K 9/522; G06T 7/262; G06T 7/248; G06T 2207/20021; G06T 2207/20056

See application file for complete search history.

(56) References Cited

U.S. PATENT DOCUMENTS

| | | | | |
|---|---|---|---|---|
| 5,621,519 A | * | 4/1997 | Frost | G01M 11/0292 348/E17.002 |
| 6,281,993 B1 | * | 8/2001 | Bernal | G03H 1/16 359/11 |
| 6,298,170 B1 | * | 10/2001 | Morita | G06T 7/74 382/278 |
| 7,194,752 B1 | * | 3/2007 | Kenyon | G10L 25/48 725/22 |
| 8,846,331 B2 | * | 9/2014 | McNaughton | C12M 41/36 435/173.1 |
| 2002/0030623 A1 | * | 3/2002 | Arikan | G01S 7/295 342/195 |
| 2005/0163341 A1 | * | 7/2005 | Han | G06K 9/3241 382/103 |
| 2006/0157574 A1 | * | 7/2006 | Farrar | G06F 21/608 235/494 |
| 2010/0007756 A1 | * | 1/2010 | Kawakami | G06T 7/593 348/222.1 |
| 2010/0328070 A1 | * | 12/2010 | Murray | G06K 9/3216 340/568.1 |

(Continued)

OTHER PUBLICATIONS

Google Scholar search results.*

*Primary Examiner* — Qun Shen
(74) *Attorney, Agent, or Firm* — Winston Hsu

(57) ABSTRACT

An image parameter calculating method comprising: (a) transforming a spatial domain target image to a frequency domain target image; (b) multiplying the frequency domain target image with a frequency domain reference image to acquire a frequency domain multiplying result; and (c) calculating at least one peak location of the spatial domain target image according to the frequency domain multiplying result.

3 Claims, 4 Drawing Sheets

(56) References Cited

U.S. PATENT DOCUMENTS

| | | | |
|---|---|---|---|
| 2011/0074676 A1* | 3/2011 | Gao | G06F 3/03545 |
| | | | 345/158 |
| 2012/0098986 A1* | 4/2012 | Robertson | H04N 19/523 |
| | | | 348/222.1 |
| 2013/0345566 A1* | 12/2013 | Weitzel | A61B 8/488 |
| | | | 600/445 |
| 2014/0055421 A1* | 2/2014 | Christiansson | G06F 3/0418 |
| | | | 345/175 |
| 2017/0004623 A1* | 1/2017 | Zalevsky | G01B 11/162 |

* cited by examiner

IMAGE PARAMETER CALCULATING METHOD, OBJECT TRACKING METHOD, AND IMAGE PARAMETER CALCULATING SYSTEM

BACKGROUND OF THE INVENTION

1. Field of the Invention

The present invention relates to an image parameter calculating method, an object tracking method and an image parameter calculating system, and particularly relates to an image parameter calculating method, an object tracking method and an image parameter calculating system which can rapidly and efficiently calculating image parameters.

2. Description of the Prior Art

Conventionally, a correlation window can be employed to calculate the image delta between two images. FIG. 1 is a schematic diagram illustrating a conventional image delta calculating system. As illustrated in FIG. 1, the peak predicting module 101 predicts a next peak location for a peak of a current image CI, based on various references, such as the peak locations for peaks of a reference image and the speed of the electronic apparatus. The peak can mean, for example, a pixel with a particular high or low brightness among pixels in a specific range.

After receiving the prediction PR, the correlation module 103 targets the peak location in a correlation window based on the prediction PR, such as the peak P in the correlation window CW for a current image CI in FIG. 2, to generate targeted peak information TPI. Then, the correlation module 103 transmits the targeted peak information TPI to the image delta calculating module 105. After that, the image delta calculating module 105 calculates the image delta ID, which may mean the pixel differences or motion vectors, between the current image CI and the reference image RI based on the targeted peak information TPI. In some examples, the correlation module 103 also transmits the offset Of for the peak location to the image delta calculating module 105, which may be caused by various factors, such as the speed of the electronic apparatus or a calculation error.

Based upon above-mentioned description, a larger number of peaks can be targeted per time if the correlation window CW is larger. By this way, the image delta can be calculated more efficiently and more rapidly. However, the size of the correlation window is limited due to the technique limitation, thus the efficiency for calculating the image delta is also limited.

SUMMARY OF THE INVENTION

One objective of the present application is to provide an image parameter calculating method and an image parameter calculating system, which can efficiently apply a small correlation window to calculate peak or image delta.

Another objective of the present application is to provide an object tracking method, which can efficiently apply a small correlation window to calculate peak or image delta.

One embodiment of the present invention discloses an image parameter calculating method, which comprises: (a) transforming a spatial domain target image to a frequency domain target image; (b) multiplying the frequency domain target image with a frequency domain reference image to acquire a frequency domain multiplying result; and (c) calculating at least one peak location of the spatial domain target image according to the frequency domain multiplying result.

Another embodiment of the present invention discloses an object tracking method for tracking an object in a spatial domain target image and in a spatial domain reference image, which comprises: (a) transforming the spatial domain target image to a frequency domain target image, and transforming the spatial domain reference image to a frequency domain reference image; (b) multiplying the frequency domain target image with the frequency domain reference image to acquire a frequency domain multiplying result; and (c) calculating at least one peak location of the spatial domain target image according to the frequency domain multiplying result; (d) targeting each of the peak location by a correlation window to generate targeted peak information; (e) calculating image delta between the spatial domain target image and the spatial domain reference image based on the targeted peak information; and (f) calculating a movement of the object between the spatial domain target image and the spatial domain reference image according to the image delta.

Another embodiment of the present invention discloses an image parameter calculating system, which comprises: a frequency domain transforming module, configured to transform a spatial domain target image to a frequency domain target image; a multiplier, configured to multiply the frequency domain target image with a frequency domain reference image to acquire a frequency domain multiplying result; and a peak calculating module, configured to calculate at least one peak location of the spatial domain target image according to the frequency domain multiplying result.

In view of above-mentioned embodiments, the peaks can be efficiently detected by a small correlation window, and the image delta can be efficiently calculated as well. Therefore, the conventional issues can be improved.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are employed to explain the concept of the present application. Please note, the components explained in following embodiments, such as a device, an apparatus or a module, can be implemented by hardware (ex. a circuit), or hardware with software (a processor with a program installed therein).

Figure 1:
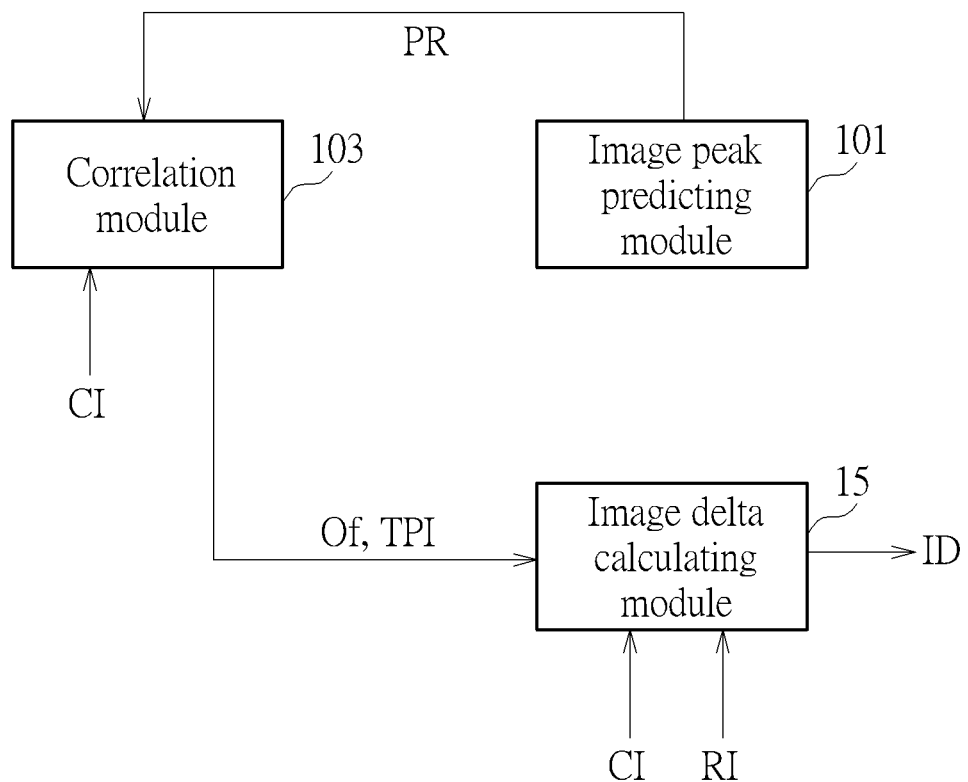
FIG. 1 is a schematic diagram illustrating a conventional image delta calculating system.
Figure 2:
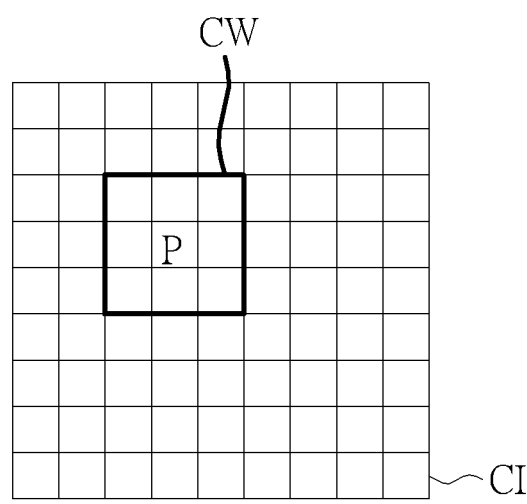
FIG. 2 illustrates a conventional correlation window.
Figure 3:
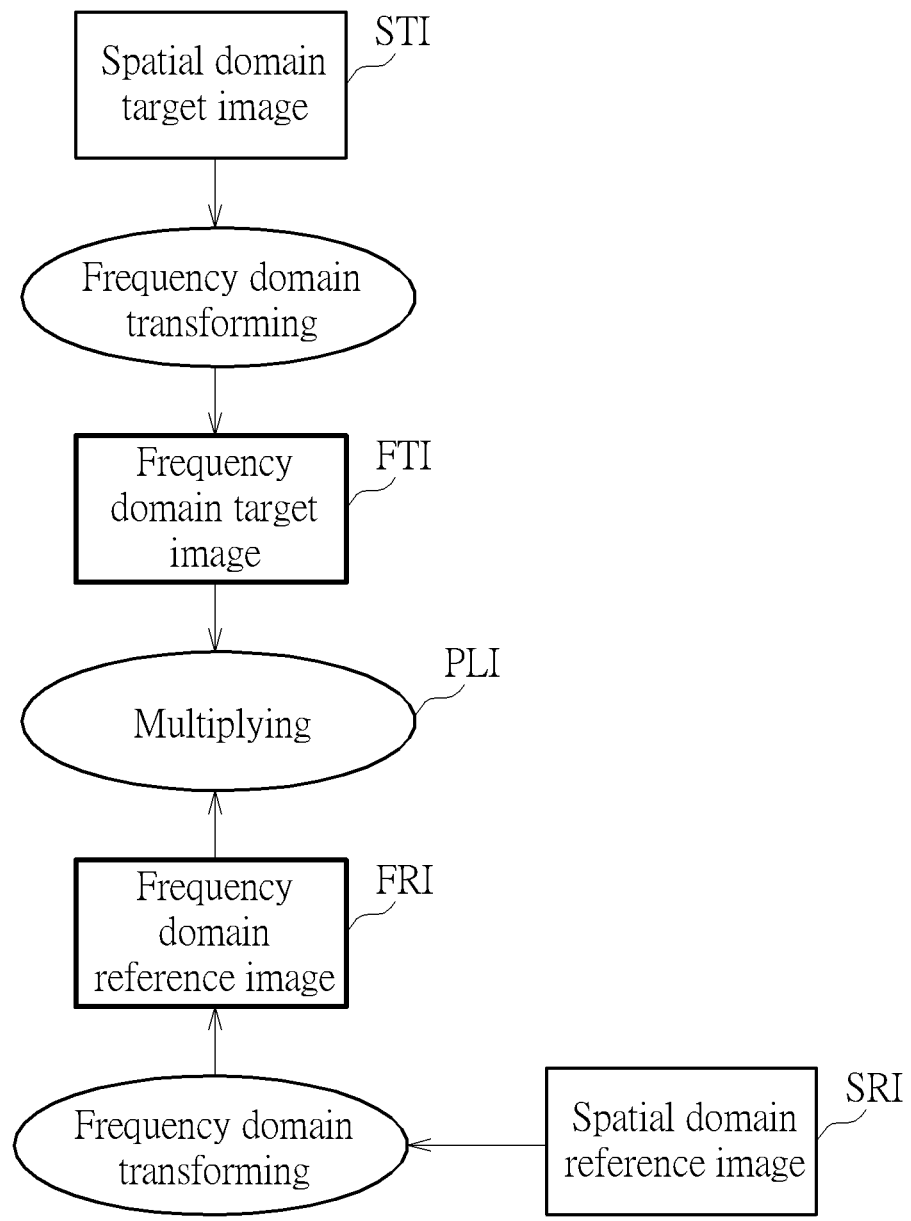
FIG. 3 is a schematic diagram illustrating a peak searching method according to one embodiment of the present invention.

FIG. 3 is a schematic diagram illustrating a peak searching method according to one embodiment of the present invention. As illustrated in FIG. 3, a spatial domain target image STI is transformed to a frequency domain target image FTI. Also, a spatial domain reference image SRI is transformed to a frequency domain reference image FRI. After that, the frequency domain target image FTI and the frequency domain reference image FRI are multiplied to acquire the peak location information PLI. In one embodiment, the spatial domain target image STI may be a spatial domain current image, and the spatial domain reference image SRI may be a spatial domain previous image, which is previous to the spatial domain current image. In one embodiment, the frequency domain transforming operation can be implemented by Fourier Transformation or Fast Fourier Transformation, but not limited.

The image signals for the spatial domain target image STI and the spatial domain reference image SRI are discrete time domain signals (ex. pixel values). Accordingly, the image signals for the frequency domain target image FTI and the frequency domain reference image FRI are discrete frequency domain signals. The multiplying for two discrete frequency domain signals can be regarded as a convolution for two discrete time domain signals. Also, the convolution for two discrete time domain signals can be employed to calculate the overlap region for the two discrete time domain signals. Therefore, the multiplying for two discrete frequency domain signals can be applied to calculate the overlap region for the corresponding discrete time domain signals. By this way, the peak location information PLI for the spatial domain target image STI can be acquired.

For explaining in another aspect, the multiplying for frequency domain target image FTI and the frequency domain reference image FRI can be regarded as a filtering operation for filtering the frequency domain target image FTI. Accordingly, via selecting proper parameter for the frequency domain reference image FRI, undesired part of the frequency domain target image FTI besides the peaks can be filtered, thus the peak location information PLI for the spatial domain target image STI can be acquired.

Figure 4:
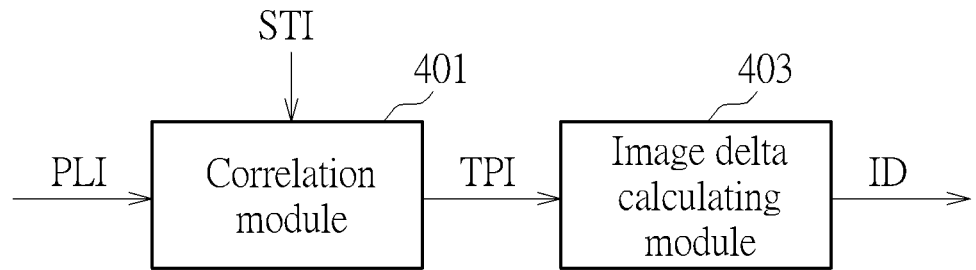
FIG. 4 is a schematic diagram illustrating an image delta calculating method according to one embodiment of the present invention.

FIG. 4 is a schematic diagram illustrating an image delta calculating method according to one embodiment of the present invention. After the peak location information PLI is acquired based on the steps illustrated in FIG. 3, the peak location information PLI is transmitted to a correlation module 401, and the correlation module 401 targets the peaks in the spatial domain target image STI by a correlation window to generate targeted peak information TPI. After that, the correlation module 401 transmits targeted peak information TPI to the image delta calculating module 403. Then, the image delta calculating module 403 calculates image delta ID between the spatial domain target image STI and the spatial domain reference image SRI based on the targeted peak information TPI.

The above-mentioned image delta ID can be applied for further purpose. For example, the above-mentioned peak calculating method is applied to an optical navigating apparatus (ex. a mouse), and the spatial domain target image STI and the spatial domain reference image SRI both comprise an object image for an object (ex. a finger). The movement for the object can be calculated based on the image delta between the spatial domain target image STI and the spatial domain reference image SRI. By this way, object tracking for the object can be performed. Detail steps for calculating object movement based on image delta are well known by persons skilled in the art, for example, an US patent with a patent number 7417623 discloses such detail steps. Accordingly, related descriptions are omitted for brevity here.

Figure 5:
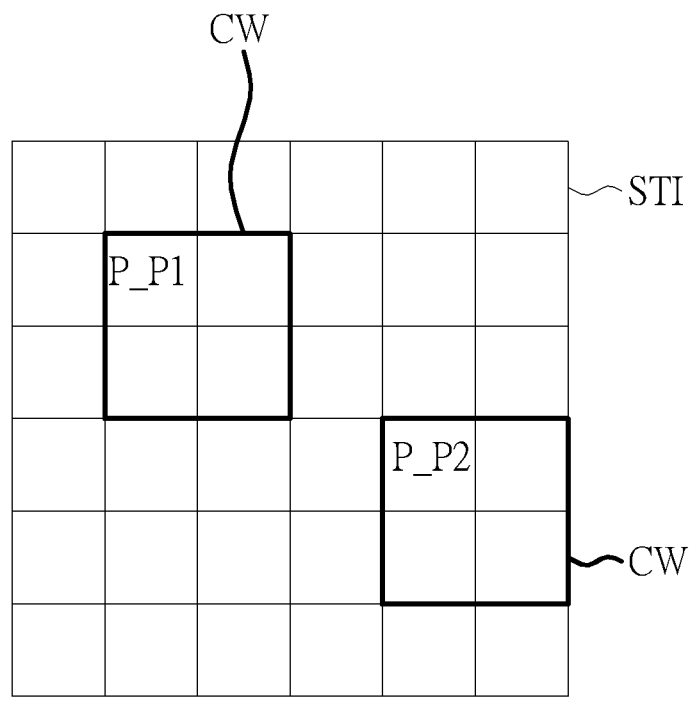
FIG. 5 is a schematic diagram illustrating targeting the peaks by a smaller correlation window.

FIG. 5 is a schematic diagram illustrating targeting the peaks by a smaller correlation window. As illustrated in FIG. 5, the peaks P_P1 and P_P2 in the spatial target image STI are respectively targeted by a correlation window CW. Since the peak locations are already acquired by the steps illustrated in FIG. 3, a small correlation window rather than a larger correlation window can be applied to target the peaks. Thus the calculating for the peaks can be more efficient.

Figure 6:
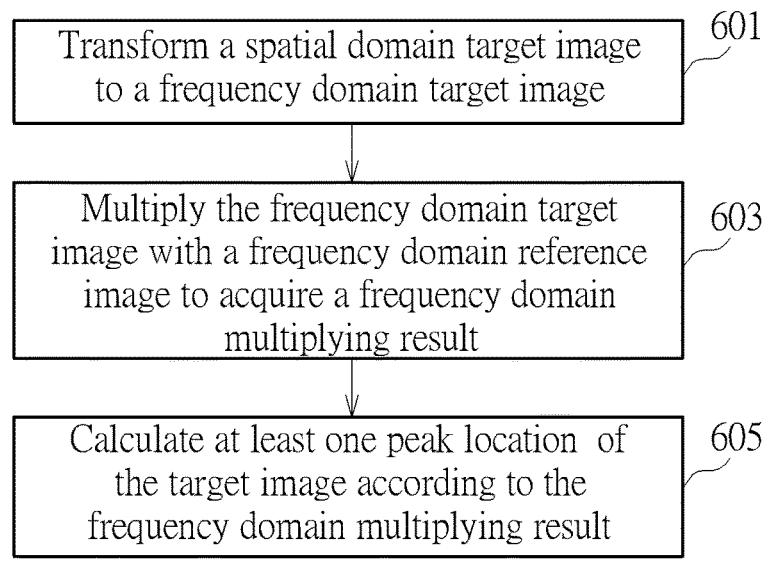
FIG. 6 is a flowchart illustrating steps of an image parameter calculating method, according to one embodiment of the present invention.

In view of above mentioned embodiments, an image parameter calculating method can be acquired, which can be employed to calculate peaks or image delta. Corresponding to the embodiment of FIG. 3, the image parameter calculating method comprises following steps, as illustrated in FIG. 6:

Step 601

Transform a spatial domain target image (ex. STI in FIG. 3) to a frequency domain target image (ex. FTI in FIG. 3).

Step 603

Multiply the frequency domain target image with a frequency domain reference image (ex. FRI in FIG. 3) to acquire a frequency domain multiplying result.

Step 605

Calculate at least one peak location (ex. peak location information PLI in FIG. 3) of the target image according to the frequency domain multiplying result.

If the image parameter calculating method corresponds to the embodiment illustrated in FIG. 4, the image parameter calculating method can further comprise: targeting each of the peak location by a correlation window to generate targeted peak information (ex. TPI in FIG. 4); and calculating image delta between the spatial domain target image and the spatial domain reference image based on the targeted peak information (ex. ID in FIG. 4).

As above-mentioned, the image delta can be applied for object tracking, which can be applied to an optical navigation device such as an optical mouse or an optical touch control device. Therefore, an object tracking method can be acquired based on above-mentioned embodiments. The object tracking method comprises above-mentioned embodiment and further comprises of: calculating a movement of the object between the spatial domain target image and the spatial domain reference image according to the image delta.

Figure 7:
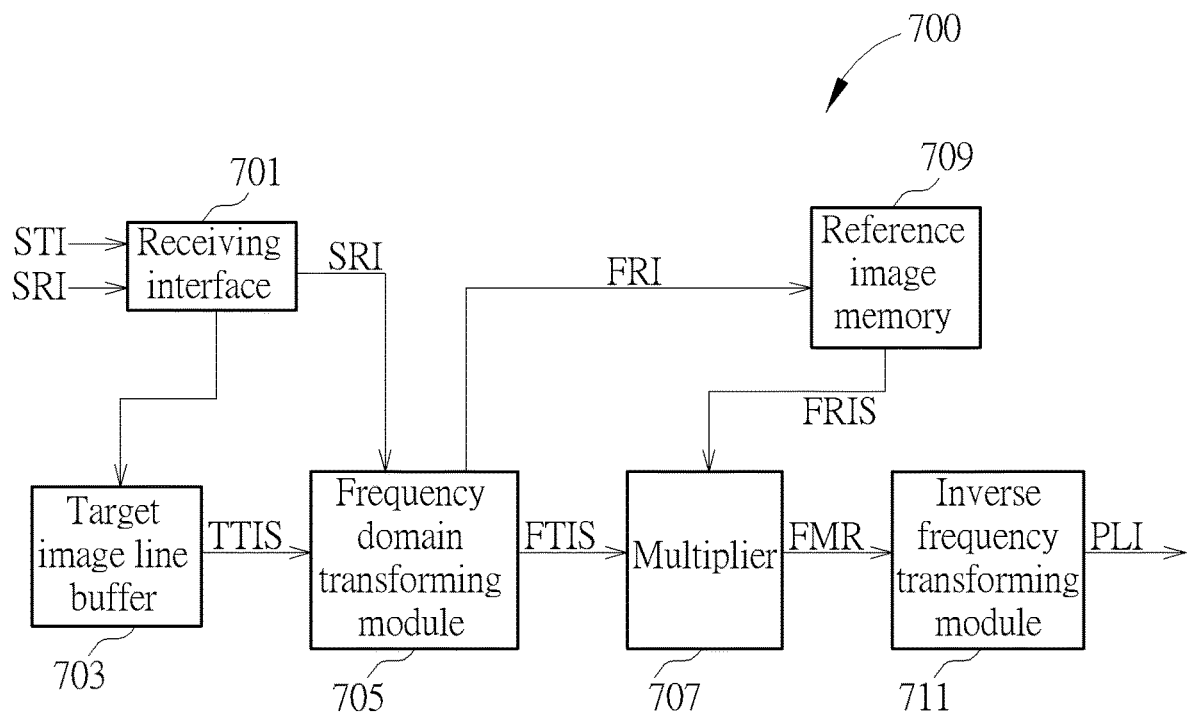
FIG. 7 is a block diagram illustrating an image parameter calculating system according to one embodiment of the present invention.

FIG. 7 is a block diagram illustrating an image parameter calculating system according to one embodiment of the present invention. Please note, FIG. 7 is only an example for implementing above-mentioned embodiment, but do not mean to limit the scope of the present invention. Other systems can reach the same function should also fall in the scope of the present invention. As illustrated in FIG. 7, the image parameter calculating system 700 comprises a receiving interface 701, a target image line buffer 703, a frequency domain transforming module 705, a multiplier 707 (ex. complex number multiplier), a reference image memory 709 and an inverse frequency transforming module 711.

The receiving interface 701 receives the spatial domain target image STI and the spatial domain reference image SRI. As above-mentioned, in one embodiment, the spatial domain target image STI is a current image, and the spatial domain reference image SRI is a previous image of the current image. The target image line buffer 703 is configured to buffer the spatial domain target image STI, and the frequency domain transforming module 705 reads the time domain target image signal TTIS (ex. pixel values of the spatial domain target image STI) from the target image line buffer 703. Then, the frequency domain transforming module 705 transforms the time domain target image signal TTIS to a frequency domain target image signal FTIS. In other words, the frequency domain transforming module 705 transforms the spatial domain target image STI to a frequency domain target image.

After that, the complex number multiplier 707 multiplies the frequency domain target image signal FTIS with a frequency domain reference image signal FRIS (ex. pixel values of frequency domain reference image FRI) to generate a frequency domain multiplying result FMR. The frequency domain reference image signal FRIS can be generated via frequency transforming the spatial domain reference image SRI to a frequency domain reference image FRI in real time, as illustrated in FIG. 7. However, the frequency domain reference image signal FRIS may be data pre-recorded in the reference image memory 709. Next, the frequency domain multiplying result FMR is inversed by the inverse frequency transforming module 711 to generate peak location information PLI. Accordingly, the inverse frequency transforming module 711 can be regarded as a peak calculating module. As above-mentioned, in one embodiment, the frequency domain transforming module 705 may be implemented by Fourier Transformation. In such case, the inverse frequency transforming module 711 can be implemented by Inverse Fourier Transformation.

In one embodiment, the image parameter calculating system 700 can further comprise the correlation module 401 and the image delta calculating module 403 illustrated in FIG. 4. Also, the image delta ID generated by the image delta calculating module 403 can be applied for object tracking. In such case, the image parameter calculating system 700 can be regarded as an object tracking system.

In view of above-mentioned embodiments, the peaks can be efficiently detected by a small correlation window, and the image delta can be efficiently calculated as well. Therefore, the conventional issues can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical mouse, comprising:
 a target image line buffer, configured to buffer a spatial domain target image;
 a frequency domain transforming circuit, configured to transform the spatial domain target image buffered by the target image line buffer to a frequency domain target image;
 a multiplier, configured to multiply the frequency domain target image with a frequency domain reference image to acquire a frequency domain multiplying result;
 a peak calculating circuit, configured to calculate at least one peak location of the spatial domain target image according to the frequency domain multiplying result, wherein the peak location is used for object tracking of an object in the spatial domain target image;
 a correlation circuit, configured to target each of the peak location in the spatial domain target image by a correlation window to generate targeted peak information; and
 an image delta calculating circuit, configured to calculate image delta between the spatial domain target image and the spatial domain reference image based on the targeted peak information;
 wherein the peak calculating circuit inverses the frequency domain multiplying result to calculate the peak location of the spatial domain target image.

2. The optical mouse of claim 1, wherein the spatial domain target image is a spatial domain current image, and the spatial domain reference image is a previous image of the spatial domain current image.

3. The optical mouse of claim 1, wherein the frequency domain transforming circuit applies Fourier Transformation to transform the spatial domain target image to the frequency domain target image.

\* \* \* \* \*